United States Patent [19]
Litke et al.

[11] Patent Number: 6,092,917
[45] Date of Patent: Jul. 25, 2000

[54] SINGLE LENS, PUSH-PUSH, DUAL LAMP ASSEMBLY

[75] Inventors: Mark R. Litke, Brighton; David L. Edstrom, Grand Haven; Graham L. Weeks, Holland; Douglas A. Fischer, Grand Rapids, all of Mich.

[73] Assignee: Lear Donnelly Overhead Systems LLC, Novi, Mich.

[21] Appl. No.: 09/186,813

[22] Filed: Nov. 5, 1998

Related U.S. Application Data

[60] Provisional application No. 60/067,101, Dec. 2, 1997.

[51] Int. Cl.⁷ .................................................. F21N 101/08
[52] U.S. Cl. ........................ 362/490; 362/488; 362/543; 362/802
[58] Field of Search .................................. 362/490, 488, 362/543, 544, 545, 251, 802

[56] References Cited

U.S. PATENT DOCUMENTS

| | | |
|---|---|---|
| 2,996,608 | 8/1961 | Clayton . |
| 3,663,781 | 5/1972 | Zimmerman et al. ............. 200/172 R |
| 4,536,829 | 8/1985 | Grimm et al. ...................... 362/544 X |
| 4,628,417 | 12/1986 | Kaminski et al. .................. 362/490 X |
| 4,710,858 | 12/1987 | Van Hout et al. ......................... 362/95 |
| 4,764,851 | 8/1988 | Hartman ............................ 362/490 X |
| 4,883,932 | 11/1989 | Van Hout et al. ...................... 200/339 |
| 5,272,603 | 12/1993 | Camarota et al. ......................... 362/95 |
| 5,357,408 | 10/1994 | Lecznar et al. ......................... 362/490 |
| 5,526,241 | 6/1996 | Ferrell ................................... 362/490 |
| 5,546,288 | 8/1996 | Van Order et al. ..................... 362/490 |
| 5,582,474 | 12/1996 | Van Order et al. ..................... 362/490 |
| 5,697,693 | 12/1997 | Wittkopp, Jr. et al. ................ 362/490 |

*Primary Examiner*—Laura K. Tso
*Attorney, Agent, or Firm*—Brooks & Kushman P.C.

[57] ABSTRACT

A lamp assembly for an overhead console having a single lens that selectively operates multiple switches connected to multiple lamps to illuminate a desired area. The single lens has multiple push surfaces such that pressing a first push surface operates one lamp, pressing a second push surface operates another lamp and pressing a third surface operates both lamps simultaneously.

8 Claims, 1 Drawing Sheet

SINGLE LENS, PUSH-PUSH, DUAL LAMP ASSEMBLY

CROSS REFERENCE TO RELATED APPLICATIONS

This application claims the benefit of U.S. Provisional patent application Ser. No. 60/067,101, filed Dec. 2, 1997.

FIELD OF THE INVENTION

This invention relates to lamp assemblies for automobiles. In one of its aspects, the invention relates to an overhead lamp assembly having a lens and multiple lamps, each operated separately by pushing on a portion of the lens.

DESCRIPTION OF THE RELATED ART

To illuminate the separate passenger areas in the front seat area, OEMs can use stand alone lamps or overhead consoles which typically include lamps. These lamps are typically actuated by a switch on the exposed base of the housing or console in which the lamp is mounted or by pressing on the individual lens which then depresses a hidden switch.

Prior lamp assemblies have fixed light transmitting lenses mounted forwardly on the lamp base or console, which leave exposed a substantial portion of console or base perimeter wall for mounting of the switch controlling illumination of the lamp assembly. In some assemblies having dual lamps, a separate fixed lens covers each lamp, requiring two switches. The common problem of these lamp assemblies is the multitude of parts necessary to mount a switch, or switches, to a console or lamp base in addition to the lens, and, in some assemblies, the need to mount a separate lens for each lamp. It is costly and inefficient to mount switches and lenses for each lamp. An alternative approach has been to use a push—push lens which pivots on an axis at one end and rests on a switch on the other end. This multi-piece, multiple-edged assembly is typically obtrusive and simply unattractive, especially if the two lenses abut each other and a smooth surface is desired between the lenses and base. In one prior light fixture, a single lens covers multiple lamps and operates a switch, which, upon repeated depressions, actuates, in order, one lamp, two lamps, and then, no lamps. This design, while reducing the number of parts and being less obtrusive, is inconvenient to the user who must go through other lighting options before achieving the desired lighting.

SUMMARY OF THE INVENTION

According to the invention, a lamp having a main housing with a base portion connected to side wall portions has first and second light sources connected to the main housing. First and second switches are mounted to the main housing in laterally spaced apart relationship and are electrically connected to the first and second light sources, respectively, for activating and de-activating the respective first and second light sources. A single, relatively rigid lens, generally translucent, is positioned at least partially within the main housing with a first end in registry with the first switch and adapted to selectively actuate the first switch and a second end in registry with the second switch and adapted to selectively actuate the second switch when depressed.

In addition, the main housing has an inwardly extending rim and the lens includes a support flange that extends outwardly beneath the inwardly extending rim on the main housing to capture the lens in the main housing. The lens has at least two spaced apart, upwardly inclined optical lenses that are connected by a generally flat central region and each of the inclined optical lenses is connected to a downwardly projecting push surface. Each of the downwardly projecting push surfaces is connected to an upwardly extending lens flange that abuts one of the first and second switches for controlling actuation of the switches and ultimately the respective light sources.

Optionally, but preferably, the push surface is positioned adjacent to and substantially flush with at least one of the side wall portions of the main housing to provide an improved aesthetic appearance.

Further, a lamp housing is located in the main housing and has first and second side walls for mounting the first and second switches, respectively. The lamp housing and the main housing can be integrally molded as one-piece to facilitate assembly.

The lamp assembly for an automobile overhead console or stand alone lamp according to the invention comprises a plurality of push—push switches operated by a single lens covering a multitude of lamps, with each lamp actuated by depressing the single lens in an area above each switch. The lamp assembly is convenient to the user, as well as unobtrusive and attractive, while minimizing the need for console or lamp base size and the number of parts that must be installed in the console, thereby reducing cost and installation time. In addition, first surface fit and finish is improved since there is only one lens and one base to match. Preferably, the lens is suspended in the console housing and is biased by the switches into a flush position with the console housing. This construction eliminates the cost of installing a lens and housing for each lamp sought to be included in the console. Preferably, the single lens is flush with the console housing outer surface, which makes a less obtrusive console and lamp assembly. Consequently, an overhead console having a pair of lamps controlled by push—push switches operatively actuated by a single lens which is suspended in the console housing is a much more cost effective, efficient and attractive method of installing lamp assemblies in overhead consoles.

BRIEF DESCRIPTION OF THE DRAWINGS

The invention will now be described with reference to the drawings in which.

DETAILED DESCRIPTION OF THE PREFERRED EMBODIMENT

Figure 1:
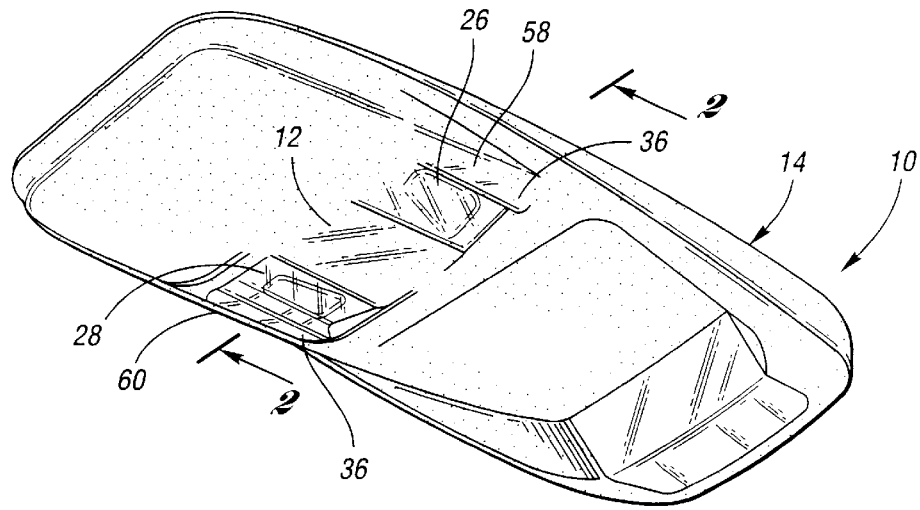
FIG. 1 is a perspective view of an assembled console including an assembled lamp assembly according to the invention.

Referring now to FIG. 1, an overhead console 10 for an automobile (not shown) has a housing 14 which mounts a single lens 12 which includes a pair of optical lenses. The overhead console 10 has side walls 58 and 60 which retain the lens 12.

Figure 2:
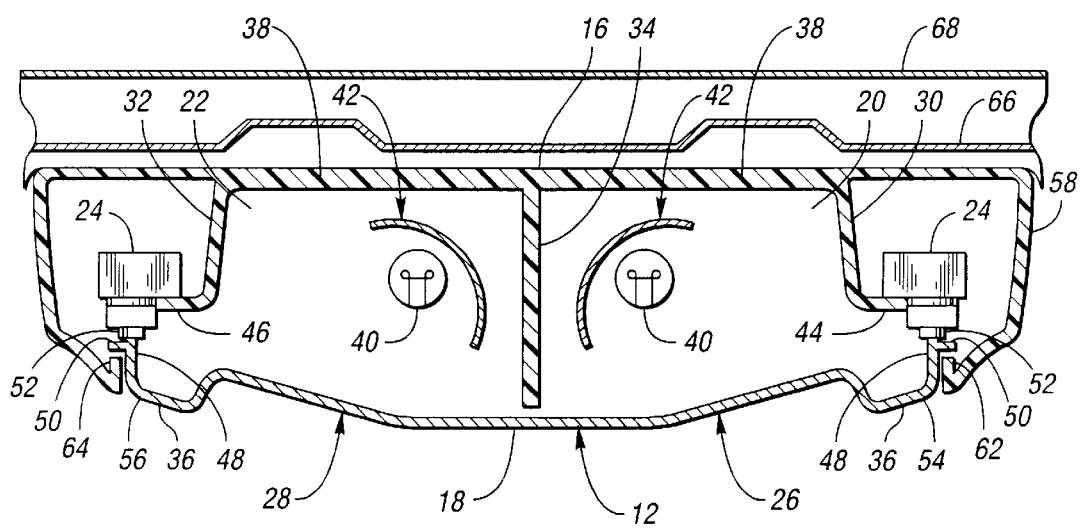
FIG. 2 is a sectional elevational side view of an assembled lamp assembly shown in FIG. 1 taken along lines 2—2 of FIG. 1 and installed in an overhead console for an automobile.

Referring now to FIG. 2, the console is mounted to a mounting bracket or sheet metal crossbeam 66 just beneath the roof 68 through conventional mounting means (not shown) in a passenger compartment of an automobile.

A lamp housing 16 has an upper wall 38 which is connected to the overhead console housing 14, side walls 30 and 32 and a central wall 34, all of which are joined together, preferably by integral molding. The central wall 34 separates the lamp housing 16 into chambers 20 and 22. Each side wall 30, 32 includes a respective lateral extension 44, 46 for mounting a switch 24 having an actuator 52. The chambers 20 and 22 are defined by the side walls 30, 32, the central wall 34 and the upper wall 38, and are covered by the lens 12.

Each chamber 20, 22 can contain a reflector 42 mounted to the lamp housing 16 in each of the chambers 20, 22 behind a lamp 40, for directing light from the lamps 40 through the optical lenses 26, 28. Preferably, lens 12 has a central, generally flat region 18 and optical lenses 26, 28 are inclined upwardly from central region 18, each optical lens forming an obtuse angle with central region 18. The lamps and reflectors mount to the lamp housing using conventional means (not shown).

The lens 12 has at its outermost ends 54, 56 an upturned flange 48, which extends upwardly in registry with each of the actuators 52 to operatively abut one of the actuators 52 of the push—push switch 24, which controls illumination of one of the respective lamps 40. The lens flanges 48 each have a lateral support flange 50 which extends outwardly above upturned ends 62, 64 of an inwardly extending rim of the console side walls 58 and 60, respectively. Thus, lens 12 is captured in housing 14 between actuator 52 and upward ends 62, 64. The actuators 52, through repeated depressions, control the state of the switches 24, which are mounted on the lateral extensions 44, 46 of the side walls 30, 32. An integral push surface 36 projects downwardly adjacent to each optical lens 26, 28 and provides an actuation surface for a user to actuate the illumination and de-illumination of an adjacent lamp. When push surface 36 is pressed upwardly toward actuator 52, at lens end 54, lens 12 pivots counterclockwise about support flange 58 at lens end 56. Similarly, lens 12 pivots clockwise about lateral support 50 at lens end 54 when push surface 36 at lens end 56 is pressed. Central region 18 of lens 12 can be pushed to simultaneously actuate both switches 24. Each lens end 54, 56 is adjacent and substantially flush with side wall 58, 60, respectively, of the overhead console housing 14 except when the lens end 54, 56 is depressed by a user to operate the switch 24. The switches 24 are conventional push—push switches which have an outwardly spring biased actuators 52 which are resiliently retractable upon pushing inwardly. Thus, the spring bias of the actuators 52 return the lens to its at rest position after the lenses have been pushed to actuate the switches.

To assemble the single lens, push—push, dual lamp assembly 10, switches 24, including actuators 52, are mounted to each of the lateral extensions 44 and 46 of the side walls 30 and 32, respectively, of the lamp housing 16. Then, one of the reflectors 42 and one of the lamps 40 is installed within each chamber 20 and 22. The lamp housing 16 is secured to the overhead console housing 14. The lamp housing can be molded integrally with the console housing. Next, the lens 12 is suspended from the console housing 14 through the lateral support flanges 50.

In operation, a person depresses the push surface 36 at end 54 of the lens 12 to actuate the switch 24 and illuminate the lamp 40 is chamber 20; and/or depresses push surface 36 at end 56 of the lens 12 to actuate the switch 24 and illuminate the lamp 40 in chamber 22. Specifically, the actuator 52 is depressed by the lens flange 50, thereby temporarily depressing, and changing the state of the push—push switch 24. Upon the person releasing pressure on the push surface 36 of the lens 12, the lens 12 returns to its normal position substantially flush at the respective lens end 54, 56 with the respective side wall 58, 60 of the overhead console 14 as a result of the natural bias of the switch actuators 52. .

The lamps 40 are turned off by similarly depressing the push surface 36, thereby depressing the actuator 52 for the switch 24 and switching off the lamp 40. Again, upon the release of pressure on the push surface 36 of the lens 12, the lens 12 returns to its normal position substantially flush at the respective lens end 54, 56 with the respective side wall 58, 60 of the overhead console 14. Each side of the lamp assembly 10 operates in the same manner and is independent of the other side. It should be noted that at all times, except for the time in which the switches 24 are operatively depressed, the outer surface of lens 12 remains substantially flush with the outer surface of the overhead console 14. In addition, both lamps can be simultaneously turned on or off by pressing the center of the lens 12.

Reasonable variation and modification are possible within the spirit of the foregoing specification and drawings without departing from the scope of the invention.

What is claimed is:

1. A lamp comprising:
   a main housing including a base portion connected to side wall portions;
   first and second light sources connected to the main housing;
   first and second switches mounted to the main housing in laterally spaced apart relationship and electrically connected to the first and second light sources, respectively, for activating and de-activating the respective first and second light sources;
   a single, relatively rigid, generally translucent lens positioned at least partially within the main housing with a first end of the lens in registry with the first switch for selectively actuating the first switch and a second end thereof in registry with the second switch for selectively actuating the second switch; and
   wherein the lens has at least two spaced apart, upwardly inclined optical lenses that are connected by a generally flat central region, the lens further comprises a downwardly projecting push surface adjacent each of the inclined optical lenses, and wherein each of the downwardly projecting push surfaces is connected to an upwardly extending lens flange that abuts one of the first and second switches.

2. The lamp of claim 1, wherein the main housing has an inwardly extending rim and the lens includes a support flange that extends outwardly beneath the inwardly extending rim on the main housing to capture the lens in the main housing.

3. The lamp of claim 1, wherein the push surface is positioned adjacent to and substantially flush with at least one of the side wall portions of the main housing.

4. The lamp of claim 1 and further comprising a lamp housing located in the main housing and having first and second side walls for mounting the first and second switches, respectively.

5. The lamp of claim 4 wherein the lamp housing and the main housing are integrally molded as one-piece.

6. A lamp assembly for use in a vehicle comprising:
   a main housing including a base portion connected to side wall portions;
   first and second light sources connected to the main housing;

first and second switches mounted to the main housing in laterally spaced apart relationship and electrically connected to the first and second light sources, respectively, for activating and de-activating the respective first and second light sources;

a single, relatively rigid, generally translucent lens positioned at least partially within the main housing with a first push surface of the lens in registry with the first switch for selectively actuating the first switch, and a second push surface thereof connected to the first push surface by a central portion of the lens and in registry with the second switch for selectively actuating the second switch;

wherein pressing the first push surface actuates the first switch and pressing the second push surface actuates the second switch and pressing the central region actuates both the first and second switches simultaneously; and wherein the lens has at least two spaced apart, upwardly inclined optical lenses that are connected by a generally flat central region, the first and second inclined optical lenses are connected to and adjacent to the first and second push surfaces, respectively, and each of the push surfaces is connected to an upwardly extending lens flange that abuts one of the first and second switches.

7. The lamp assembly of claim 6, wherein the main housing has an inwardly extending rim and the lens includes a support flange that extends outwardly beneath the inwardly extending rim on the main housing to capture the lens in the main housing.

8. The lamp of claim 6, wherein the push surface is positioned adjacent to and substantially flush with at least one of the side wall portions of the main housing.

* * * * *